United States Patent [19]

Longi et al.

[11] 4,013,823

[45] Mar. 22, 1977

[54] PROCESS FOR PREPARING ELASTOMERIC COPOLYMERS OF ETHYLENE AND HIGHER ALPHA-OLEFINS

[75] Inventors: Paolo Longi; Nazzareno Cameli; Sandro Parodi; Remo Cervi, all of Milan, Italy

[73] Assignee: The B. F. Goodrich Company, Akron, Ohio

[22] Filed: Feb. 7, 1975

[21] Appl. No.: 547,928

Related U.S. Application Data

[63] Continuation of Ser. No. 368,358, June 8, 1973, abandoned.

[30] Foreign Application Priority Data

June 9, 1972 Italy .............................. 25464/72

[52] U.S. Cl. .............................. 526/166; 526/125; 526/185; 526/348; 526/916
[51] Int. Cl.² .............. C08F 210/00; C08F 212/00; C08F 110/02
[58] Field of Search .......... 260/88.2, 80.78, 94.9 B; 526/185, 348, 916, 116, 125

[56] References Cited

UNITED STATES PATENTS 3,642,746  2/1972  Kashiwa ........................... 526/114

*Primary Examiner*—Joseph L. Schofer
*Assistant Examiner*—A. L. Clingman

[57] ABSTRACT

High yields of elastomeric copolymers of ethylene and higher alpha-olefins, or of ethylene, higher alpha-olefins and unsaturated monomers (polyenes) containing two or more double bonds are obtained by copolymerizing a mixture of the monomers in contact with a catalyst prepared by mixing a catalyst-forming component which is an organometallic compound of aluminum with a supported catalyst-forming component obtained by contacting a halogenated titanium compound with a carrier or support consisting of or comprising an anhydrous Mg or Mn halide partially or completely complexed with a Lewis base capable of forming a complex with it.

The copolymers so obtained have valuable mechanical properties, in particular a relatively low value of permanent set and do not exhibit excessive residual deformation at break.

4 Claims, No Drawings

PROCESS FOR PREPARING ELASTOMERIC COPOLYMERS OF ETHYLENE AND HIGHER ALPHA-OLEFINS

This is a continuation of application Ser. No. 368,358, filed June 8, 1973, now abandoned.

THE PRIOR ART

The prior art discloses the preparation of elastomeric copolymers of ethylene and higher alpha-olefins, and of ethyelene and both higher alpha-olefins and polyenes, with the aid of catalysts of various types. The catalyst most usually employed has been the product obtained by mixing an organometallic compound or hydride of a metal belonging to one of Groups I to III of the Mendelyeev Periodic Table with a vanadium compound. Such catalysts result in the production of substantially amorphous, saturated and vulcanizable copolymers of ethylene and higher alpha-olefins, or of ethylene, higher alpha-olefins and polyenes which have valuable elastomeric properties in the vulcanized state. On the other hand, the yield of copolymer obtained, based on the amount of such catalysts used, is not very high. In addition, the elastomeric copolymers obtained require special after-treatments for the removal of catalyst residues before being vulcanized and used as synthetic rubbers.

No prior art is known which discloses the preparation of elastomeric, vulcanizable copolymers of ethylene and higher alpha-olefins, or of ethylene, higher alpha-olefins and polyenes, with the aid of catalysts as used in the practice of the present invention.

It has been disclosed in applications for patent originating with our group that catalysts prepared by mixing a hydride or organometallic compound of a Groups I to III metal with the product obtained by contacting a Ti compound with an active anhydrous halide of Mg, Mn, Zn, or Ca are very active in the polymerization of ethylene to highly crystalline polyethylene in high yields based on the amount of the Ti compound used.

Also, an application for patent originating with our group discloses the production of saturaed elastomeric copolymers of ethylene and higher alpha-olefins, and of ethylene, higher alpha-olefins and hydrocarbon monomers containing more than one double bond by copolymerizing the mixed monomers under special conditions with the aid of catalysts prepared by mixing a hydride or organometallic compound of a metal belonging to Group I to III with the product obtained by contacting halogenated Ti compounds, Ti-alcoholates, Ti amides, Ti salts of organic acid, or Ti-mercaptides with an active anhydrous halide of Mg, Mn or Ca.

While the supported catalysts referred to above are highly active when used in the copolymerization of ethylene and higher alpha-olefins, they tend to result in elastomeric copolymers which, in the vulcanized state, are subject to undesirable residual deformation at break.

It is also known from U.S. Pat. No. 3,642,746 that the copolymerization of ethylene with propylene or other alpha-olefins can be carried out in the presence of supported Ziegler-type catalysts, wherein the supported component is obtained by pre-forming a complex of a Mg or Mn dihalide with a Lewis base, and then reacting the complex with a liquid Ti halogenated compound under conditions as to remove the Lewis base from the Mg or Mn dihalide and then isolating from the reaction mixture said Mg or Mn dihalide substantially free from the base. The essential characteristic of said process consists therefore in that the Lewis base must be pre-complexed with the Mg dihalide and then removed from it before contacting the same with the Al organic compound. Furthermore, the order of addition of reactants is critical in order to obtain active catalysts. For instance, if the Ti compound, the Mg dihalide and the Lewis base are added simultaneously or if the Lewis base is added to the Al organic compound, catalysts are obtained that are much less active than those prepared according to the invention of said U.S. patent. The copolymers obtained according to said process give vulcanized products having high residual deformation at break. The yield of copolymer/g titanium is generally low. A representative species of this class of catalysts is used in comparative example 3.

THE PRESENT INVENTION

An object of this invention is to provide a process for preparing, in high yields based on the amount of catalyst used, amorphous saturated and vulcanizable copolymers of ethylene and higher alpha-olefins, and of ethylene, higher alpha-olefins and polyenes which after vulcanization have valuable mechanical properties including a relatively low permanent set and no excessive residual deformation at break and which do not require special after-treatments for removal of catalyst residues before being vulcanized and used as synthetic rubbers.

That and other objects are achieved by the present invention in accordance with which a mixture of ethylene and one or more higher alpha-olefins, or a mixture of ethylene, one or more higher alpha-olefins and one or more polyenes, i.e., hydrocarbon monomers containing two or more double bonds, is copolymerized in contact with a catalyst prepared by mixing a. a hydride or organometallic compound of, specifically aluminum, with b. another catalyst-forming component which is the product obtained by fixing a halogenated Ti compound on a support consisting or comprising anhydrous Mg or Mn halide modified by being partially or completely complexed with a Lewis base capable of forming a complex with it.

According to another embodiment of this invention the copolymerization is carried out in presence of a catalyst prepared by mixing component (a) in which the organometallic compound of aluminum is partially complexed with the Lewis base with component (b) which is obtained by contacting the Ti-halogenated compound with a support consisting or comprising an anhydrous preactivated Mg or Mn halide or under conditions as to form the activated Mg or Mn halide.

In any case the molar ratio between the anhydrous Mg or Mn halide and the Lewis base with which it is partially or completely complexed is from 1:2 to 20:1.

By "anhydrous activated Mg or Mn halide" as used herein is meant an anhydrous Mg or Mn halide activated to a state such that, independently of particle size, it has a surface area higher than 5 m$^2$/g.

The preactivated Mg or Mn halides can be obtained by various methods. One suitable method consists in dissolving the anhydrous halide in alcohols, ethers or other anhydrous organic solvent, removing the bulk of the solvent by rapid evaporation, and then completing removal of the solvent at reduced pressure and at temperatures above 100° C, in particular at a temperature from 150° C to 400° C.

Another method consists in subjecting the anhydrous Mg or Mn halide to intensive grinding, until it has a surface area higher than 5 m$^2$/g.

However the preferred one consists in cogrinding the Ti halogenated compound and the mg or Mn dihalide under conditions as to obtain a surface area higher than 5 m$^2$/g.

Component (b) of the catalyst can be prepared by treating with the halogenated titanium compound a pre-formed complex of the anhydrous Mg or Mn halide with the Lewis base capable of complexing with it, under conditions so as to fix the titanium compound on the support. For instance the treating can be conducted by refluxing a hydrocarbon solution of the Ti-compound in the presence of the carrier. The pre-formed complex may be prepared by various methods. For instance, it can be prepared by dissolving the Mg or Mn halide in the Lewis base under heating, followed by cooling to precipitate the complex and separation of the complex from the reaction mixture.

Instead of using a pre-formed complex, catalyst component (b) can be prepared by contacting the halogenated Ti compound with the carrier or support consisting of or comprising the preactivated anhydrous Mg or Mn halide in the presence of an amount of the Lewis base such that the total molar ratio between the active anhydrous Mg or Mn halide (including the portion of the halide which is complexed with the base and any portion thereof which is not complexed) and the Lewis base is from 1:2 to 20:1.

According to the preferred method, the catalyst-forming component (b) is prepared by grinding the Lewis base with an anhydrous Mg or Mn halide or a mixture of a pre-formed complex thereof with Mg or Mn halide, adding the halogenated Ti compound to the milled product and continuing the grinding. It is also possible to prepare the catalyst component (b) by co-grinding the Ti-compound with a reformed complex of the Mg or Mn halide with the base.

The grinding is conducted under conditions in which, in the absence of the base or the complex therefrom, the ground Mg or Mn halide has a surface area larger than 5 m$^2$/g. It was found that the co-grinding in the presence of the Lewis base or of the preformed complex thereof generally yields a product having a surface area remarkably lower than that obtained in the absence of the base.

Grinding of the anhydrous Mg or Mn halide which can be complexed or not, or of a mixture thereof with a Lewis base, or with a Lewis base and the halogenated Ti compound is preferably carried out in a ball mill in the dry condition, i.e., in the absence of inert liquid diluents.

The anhydrous Mg or Mn halides which can be in the active state or not may be used in admixture with inert solid diluents selected from anhydrous compounds of metals belonging to Groups I to IV and different from the Mg or Mn halide, without appreciable decrease in the remarkably high activity of the catalysts in the copolymerization of the mixed monomers. Particularly satisfactory results have been obtained using alumina as the inert solid diluent.

The Lewis base used in preparing catalyst-forming component (b) must be capable of forming complexes with the Mg or Mn halides. Generally, such bases are selected from electron donor compounds in which the electron donor atom is (or atoms are) O, P or N.

Lewis bases which have resulted in high yields of the copolymers having good mechanical properties include:

benzonitrile, acetonitrile, p-anisonitrile, POCl$_3$, triethylamine, pyridine, ethylbenzoate, ethyl ether, ethyl acetate, diethylanilin, ethyl para-anisate, diethyl carbonate, trimethyl phosphite, ethyl-N,N-diethyl carbamate.

As mentioned, the molar ratio between the Mg or Mn halide and Lewis base in component (b) of the catalyst is comprised between 1:2 and 20:1. The best results have been achieved with ratios ranging from 2:1 to 5:1. Generally it may be noticed that the copolymer yield tends to decrease as the Lewis base content increases, while the elastomeric properties tend to improve upon decrease of such ratio.

The titanium compounds used in preparing component (b) according to this invention comprise the halides, oxychlorides and haloalcoholates, as well as the halotitanates and halotitanites. Other useful titanium compounds are those which can be obtained from the aforesaid Ti-compounds, and from the alcoholates and amides of the alkaline metals, such as LiTi(OC$_2$H$_7$)Cl$_3$.

Typical examples of titanium compounds which may be used in practice in the present invention include: TiCl$_4$, TiCl$_3$, 3TiCl$_3$.AlCl$_3$, Ti(OC$_3$H$_7$)Cl$_3$, Ti(OC$_4$H$_9$)$_2$Cl, Ti[O—C(CH$_3$) = CH—CO—CH$_3$]$_2$Cl$_2$, Ti[N(C$_2$H$_5$)$_2$]Cl$_3$, Ti[N(C$_6$H$_5$)$_2$]Cl$_3$, (TiCl$_3$—OSO$_2$—C$_6$H$_5$), Ti(C$_6$H$_5$COO)Cl$_3$, [N(C$_4$H$_9$)$_4$]2TiCl$_6$, [N(CH$_3$)$_4$]Ti$_2$Cl$_9$, TiBr$_4$.O(C$_2$H$_5$)$_2$, 2TiCl$_3$.C$_5$H$_5$N, LiTi(OC$_3$H$_7$)$_2$Cl, TiCl$_3$CH$_3$, TiCl$_3$C$_5$H$_5$, TiCl$_3$C$_6$H$_5$S, and Ti[SC$_5$N(C$_6$H$_5$)$_2$]$_2$Cl$_2$.

The amount of the titanium compound used to prepare the supported catalytic component is comprised within wide limits, from less than 0.1% by weight with respect to the support to 30% by weight or even more.

Particularly satisfactory results, as regards copolymer yield referred to the Ti-compound, are attained when the amount of the Ti-compound compound fixed on the carrier and expressed as Ti metal ranges from 0.5 to 5% by weight.

Among the hydrides and organometallic compound of Al which are suitable for use as catalyst-forming component (a) are:

Al(C$_2$H$_5$)$_3$, Al(iC$_4$H$_9$)$_3$, Al(C$_2$H$_5$)$_2$H, Al(iC$_4$H$_9$)$_2$H, and Al(C$_2$H$_5$)$_2$Cl.

The molar ratio between the organometallic compound or hydride and the Ti-compound is not critical. Preferably it is comprised between 50 and 1000.

The copolymerization process according to this invention is carried out in the liquid phase either in the presence or absence of inert diluents. The copolymerization is preferably conducted in a mixture of the liquod monomers, in the absence of inert diluents. If inert diluents are used, the amounts of same should be preferably lower than 50% by weight with respect to the monomers.

Inert diluents that may be employed as a reaction medium are for example: the liquid aliphatic, aromatic and cycloaliphatic halogenated and non-halogenated hydrocarbons, such as, for instance, n-hexane, n-heptane, benzene, toluene, xylene and cyclohexane.

The copolymerization temperature is preferably comprised between −20 and +80° C. It is possible, however, to operate both below −20° C, e.g. at temperatures that may reach −50° C, and at temperatures above 80° C, e.g. up to 150° C. When the copolymerization is conducted in the absence of inert diluents, the copolymerization temperature is preferably comprised between 0° and +40° C.

The ethylene/propylene elastomeric copolymers are prepared by maintaining, in the polymerization liquid phase, an ethylene: propylene molar ratio lower than or equal to 1:4. The ethylene content in the binary copolymers generally varies from 30% to 70% by weight. The diene or polyene content in the unsaturated copolymers ranges from 0.1 to 2 mol-%.

dienes or polyenes there can be used cyclic or acyclic nonconjugated dienes and polyenes, for example cyclooctadiene-1,5, dicyclopentadiene, norbornadiene, ethylidene-norbornene, 5-methyltetrahydroindene, hexadiene-1,4, 4,8-dimethyl-1,4,9-decatriene and endomethylenic containing dienes. The molecular weight of the copolymers thus formed may be regulated during the copolymerization by operating in the presence of chain-transfer agents, such as, for example, alkyl halides, organometallic compounds of Zn or Cd or hydrogen. As is known, the activity of the catalysts obtained from the transition metal compounds and from organometallic compounds of metals belonging to Groups I to III of the Mendelyeev Periodic System, so-called "Ziegler catalysts", is considerably reduced by the presence, in the polymerization system, of hydrogen or of other chain-transfer agents: used to regulate the polymer molecular weight. In the present invention, conversely, it is possible to achieve the considerable advantage of regulating the molecular weight of the copolymers within limits of practical utility (corresponding to inherent viscosity values ranging from 1.5 to 4 dl/g measured in tetralin at 135° C) still maintaining a high copolymer yield in relationship to the amount of catalyst used.

The following examples are given to illustrate the present invention, and are not intended as limiting.

The comparative examples 1 to 4 are given to show that the presence of the Lewis base in the catalysts used in the process of the present invention is critical. In fact comparative examples 1 and 4 wherein no Lewis base is used, and the comparative examples 2 and 3 wherein the Lewis base is removed from the catalyst, show that the elastomeric characteristics of the copolymers obtained are remarkably lower than those of the copolymers obtained according to the process of this invention. Compare for example the residual deformation of the vulcanizate of the comparative examples 2 and 3 with that of example 2 to 4.

COMPARATIVE EXAMPLE 1

9:1 g of anhydrous $MgCl_2$, calcined at 450° C for 48 hours in a gaseous HCl flow, and 0.39 g of $TiCl_4$ are ground in a nitrogen atmosphere for 62 hours at a temperature of 20° C in a glass mill (length = 100 mm, diameter = 50 mm), containing 550 g of steel balls of 9.5 mm diameter. 530 g of propylene are introduced into a 3 l steel autoclave, fitted with a pressure gauge, a stirrer, a thermometer, and thermoregulated at +5° C. Ethylene is charged in at a pressure of 8.5 atm. and hydrogen up to 9.5 atm.

Under a nitrogen pressure, the autoclave is fed with the catalyst prepared by mixing, in 8 cc of n-heptane, 2 cc of $Al(iC_4H_9)_3$ with 0.07 g of a mixture made up of $MgCl_2$ and $TiCl_4$. During the run the pressure is kept constant by feeding the ethylene. Polymerization is stopped after 1 hour. 202 g of dry product are obtained.

On infrared spectrographic analysis, the copolymer is found to contain 44% by weight of propylene. On the X-ray analysis the copolymer exhibits a crystallinity of the polyethylene type of 4.5%. The inherent viscosity in tetralin at 135° C (25 g of copolymer in 100 cc) is 2.1 dl/g.

100 parts by weight of copolymer are mixed in a roll mixer with 50 parts of carbon black HAF, 6.75 parts of Perkadox BC 40 (40% dicumylperoxide) and 0.32 parts of sulphur. The mix is vulcanized in a press at 165° C for 40 minutes. A vulcanized plate is thus obtained having the following characteristics:
tensile strength = 202 kg/cm$^2$
elongation at break = 440%
modulus at 300% = 122 kg/cm$^2$
residual deformation at break = 24%

COMPARATIVE EXAMPLE 2

7 g of anhydrous $MgCl_2$ and 3.8 g of benzonitrile are ground at 20° C for 48 hours in the apparatus described in comparative Example 1. 6.9 g of $MgCl_2 \cdot \frac{1}{2}C_6H_5CN$ are suspended in $TiCl_4$ and mixed at 125° C for 1.5 hours in a nitrogen atmosphere.

The suspension is hot filtered, repeatedly washed with an excess of $TiCl_4$ at 125° C until removal of benzonitrile and washed at last with n-heptane until disappearance of the chlorine ions in the washing medium. After drying under vacuum the product contains 1.58% by weight of titanium.

The autoclave described in comparative Example 1, thermoregulated at +5° C, is fed in the order stated with: 510 g of propylene, ethylene up to a pressure of 8.5 atm., hydrogen up to a pressure of 9.5 atm. and the catalyst prepared by mixing, in 8 cc of n-heptane, 2 cc of $Al(iC_4H_9)_3$ with 0.05 g of the $MgCl_2/TiCl_4$ mixture prepared as described hereinabove. During the run, the pressure is kept constant by making up with ethylene.

The run is stopped after 1 hour. 184 g of copolymer are obtained having a propylene content of 45.5 % by weight and a crystallinity of the polyethylene and polypropylene type of 9.5%. The inherent viscosity is 2.2 dl/g.

The copolymer vulcanized with the mix and under the conditions described in comparative Example 1 exhibits the following characteristics:
tensile strength = 214 kg/cm$^2$
elongation at break = 420%
modulus at 300% = 133 kg/cm$^2$
residual deformation at break = 20%

COMPARATIVE EXAMPLE 3

19.14 g of anhydrous $MgCl_2$, suspended in 100 cc of hexane, are admixed, under stirring and in a nitrogen atmosphere, with 10.1 g of benzonitrile. After heating at reflux for 6 hours, the mixture is filtered and dried under vacuum. 22.6 g of a solid product are thus obtained, whose composition corresponds to the formula $MgCl_2 \cdot \frac{1}{2}C_6H_5CN$.

9.4 g of $MgCl_2 \cdot \frac{1}{2}C_6H_5CN$ are treated with an excess of $TiCl_4$ under conditions of comparative example 2. After drying under vacuum the product contains 0.24 % by weight of titanium.

Operating under the conditions described in comparative example 2, a copolymerization test is carried out employing 0.126 g of the $MgCl_2 + TiCl_4$ mixture prepared as described herein.

53.5 g of a copolymer are obtained, having a propylene content of 47.6% by weight and a crystallinity of the polyethylene type of 6.7%. The inherent viscosity is equal to 2.1 dl/g.

The copolymer vulcanized with the mixture and under the conditions described in comparative example 1 presents the following characteristics:
tensile strength = 200 kg/cm$^2$
elongation at break = 420%
modulus at 300% = 115 kg/cm$^2$
residual deformation at break = 20%

COMPARATIVE EXAMPLE 4

A copolymerization run is effected at +5° C in a 3 l autoclave by introducing thereinto, in the order:
515 g of propylene, ethylene up to a pressure of 7.7 atm., hydrogen up to a pressure of 8.7 atm. and a catalyst prepared by mixing, in 8 cm$^3$ of n-heptane, 2 cm$^3$ of Al(iC$_4$H$_9$) with 0.071 g of a TiCl$_4$/MnCl$_2$ mixture obtained by grinding 6.72 g of anhydrous MnCl$_2$ and 0.29 g of TiCl$_4$ for 62 hours.

The run is stopped after 1 hour.

67 g of copolymer are obtained, having the following characteristics:
propylene content = 53.2% by weight
inherent viscosity = 2.3 dl/g On the X-ray analysis the copolymer exhibits a crystallinity of 7.6%.

The copolymer vulcanized with the recipe and under the conditions described in comparative example 1 presents the following characteristics:
tensile strength = 204 kg/cm$^2$
elongation at break = 420%
modulus at 300% = 117 kg/cm$^2$
residual deformation at break = 14%

By comparing the residual deformation of this vulcanizate with that of the vulcanizate of example 33, it can be seen that the latter is remarkably lower.

EXAMPLE 1

525 g of propylene, ethylene up to a pressure of 7.7 atm and hydrogen up to a pressure of 8.7 atm are introduced into the autoclave as described in comparative example 1, thermoregulated at +5° C. The autoclave is then fed, under a nitrogen pressure, with a catalyst obtained by mixing, in 4 cc of n-heptane, 0.036 g of the MgCl$_2$/TiCl$_4$ mixture prepared as described in comparative example 1, with 2 cc of Al(iC$_4$H$_9$)$_3$ reacted for 1 minute in 5 cc of n-heptane with 0.02 cc of benzonitrile. The pressure is kept constant during the run by making up with ethylene. The run is stopped after 1 hour.

50.5 g of copolymer are obtained, having a propylene content of 52.4% by weight and a crystallinity of the polyethylene and propylene type of 7.8%. The inherent viscosity is 1.9 dl/g.

100 parts by weight of the copolmer are mixed in a roll mixer with 50 parts of carbon black HAF, 6.75 parts of Perkadox BC 40 (40% dicumylperoxide) and 0.32 parts of sulphur. The mix is vulcanized in a press at 165° C for 40 minutes.

The vulcanized copolymer exhibits the following characteristics:
tensile strength = 217 kg/cm$^2$
elongation at break = 420%
modulus at 300% = 126 kg/cm$^2$
residual deformation at break = 16%

EXAMPLE 2

6.16 g of anhydrous MgCl$_2$ and 3.34 g of benzonitrile are ground in a nitrogen atmosphere at 20° C in the mill described in comparative example 1. 0.41 g of TiCl$_4$ is admixed after 24 hours. Grinding is carried on for a further 62 hours.

The autoclave described in example 1, thermoregulated at +5° C, is fed, in the order, with:
550 g of propylene, ethylene up to a pressure of 7.7 atm., hydrogen up to a pressure of 8.7 atm. and a catalyst prepared by mixing, in 8 cc of n-heptane, 2 cc of Al(iC$_4$H$_9$)$_3$ with 0.028 g of the product obtained by grinding the TiCl$_4$/MgCl$_2$. ½C$_6$H$_5$CN mixture (Ti content = 1% by weight).

The pressure is kept constant during the run by making up with ethylene. The run is stopped after 1 hour.

130 g of copolymer are obtained, having a propylene content of 43% by weight and a crystallinity of the polyethylene type of 2.3%. The inherent viscosity of 1.8 dl/g. The copolymer of this and of the following examples was vulcanized with the recipe and under the conditions described in Example 1. The vulcanized copolymer exhibits the following characteristics:
tensile strength = 212 kg/cm$^2$
elongation at break = 400%
modulus at 300% = 133 kg/cm$^2$
residual deformation at break = 10%

EXAMPLES 3 to 20

Copolymerization runs are carried out according to the same method as described in example 2, using complexes of MgCl$_2$ with various Lewis bases as carrier of TiCl$_4$.

The preparation of the complexes and the fixation of TiCl$_4$ have been carried out under the same conditions as described in example 2. The results obtained are reported on Table I.

The vulcanization has been carried out with the mix and under the conditions illustrated in comparative example 1.

TABLE I

| Ex. | Carrier Type | g | Fixed Ti % by wgt. | Al(iC$_4$H$_9$)$_3$ cc | Ethylene overpressure atm | Hydrogen overpressure atm | Time required h |
|---|---|---|---|---|---|---|---|
| 3 | MgCl$_2$ 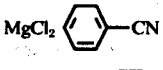—CN | 0.057 | 1 | 2 | 1.7 | 1 | 2 |
| 4 | MgCl$_2$ . 1/4 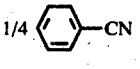—CN | 0.03 | 1 | 2 | 1.9 | 1 | 1 |
| 5 | MgCl$_2$ . 1/2 CH$_3$O 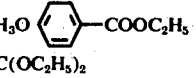—COOC$_2$H$_5$ | 0.045 | 1 | 2.3 | 1.9 | 1 | 1 |
| 6 | MgCl$_2$ . 1/4 OC(OC$_2$H$_5$)$_2$ | 0.045 | 1 | 1.7 | 1.9 | 1 | 1 |

TABLE I-continued

| | | | | | | | |
|---|---|---|---|---|---|---|---|
| 7 | MgCl$_2$ . 1/2 ⬡—COOC$_2$H$_5$ | 0.031 | 1 | 1.8 | 2.2 | 1 | 1 |
| 8 | MgCl$_2$ . 1/2 coumarine | 0.053 | 1 | 3 | 1.9 | 1 | 1 |
| 9 | MgCl$_2$ . 1/5 CH$_3$COCH$_3$ | 0.068 | 1 | 1 | 1.9 | 1 | 2 |
| 10 | MgCl$_2$ . 1/4 ⬡COCH$_3$ | 0.05 | 1 | 2 | 1.9 | 1 | 1 |
| 11 | MgCl$_2$ . 1/4 ⬡CHO | 0.04 | 1 | 1.6 | 1.9 | 1 | 1 |
| 12 | MgCl$_2$ . 1/2 N(C$_2$H$_5$)$_2$ | 0.05 | 1 | 3.3 | 1.9 | 1 | 1 |
| 13 | MgCl$_2$ . 1/5 ⬡N(C$_2$H$_5$)$_2$ | 0.042 | 1 | 1.3 | 1.9 | 1 | 1 |
| 14 | MgCl$_2$ . 1/2 N⬡ | 0.122 | 1 | 9 | 1.5 | 1 | 2 |
| 15 | MgCl$_2$ . 1/4 CH$_3$O ⬡CON(C$_2$H$_5$)$_2$ | 0.037 | 1 | 1.2 | 1.9 | 1 | 1 |
| 16 | MgCl$_2$ . 1/4 CH$_3$O ⬡COCl | 0.044 | 1 | 1.5 | 1.9 | 1 | 1 |
| 17 | MgCl$_2$ . 1/2 CH$_3$CN | 0.052 | 1 | 2 | 1.9 | 1 | 2 |
| 18 | MgCl$_2$ . 1/2 CH$_3$O ⬡CN | 0.033 | 0.9 | 2 | 2.2 | 1 | 1 |
| 19 | MgCl$_2$ . 1/2 POCl$_3$ | 0.045 | 1 | 2.5 | 1.9 | 1 | 0.5 |
| 20 | MgCl$_2$ . 1/4 P(OCH$_3$)$_3$ | 0.05 | 1 | 1.8 | 1.9 | 1 | 2 |

| | | | | | Vulcanization | | |
|---|---|---|---|---|---|---|---|
| Ex. | Copolymer | C$_3$ % by weight | % crystallinity (X-ray) | inherent $\eta$ dl/g | tensile strength kg/cm$^2$ | elongation at break % | M$_{300}$ kg/cm$^2$ | residual information at break % |
| 3 | 50 | 42.4 | 3.9 | 2.1 | 220 | 390 | 150 | 10 |
| 4 | 137 | 49 | 2.6 | 1.8 | 196 | 360 | 151 | 10 |
| 5 | 93 | 44 | 3 | 2.1 | 227 | 390 | 170 | 10 |
| 6 | 72 | 41 | 1.8 | 2.2 | 210 | 390 | 137 | 10 |
| 7 | 135 | 48 | traces | 1.9 | 221 | 440 | 122 | 12 |
| 8 | 34.5 | 44.6 | traces | 2.3 | 220 | 400 | 139 | 10 |
| 9 | 67.5 | 49.4 | 3.6 | 2.4 | 214 | 450 | 113 | 12 |
| 10 | 35 | 54.8 | traces | 2 | 213 | 440 | 124 | 12 |
| 11 | 14 | 47.2 | 5.8 | 2.7 | 211 | 420 | 130 | 16 |
| 12 | 9.5 | 43.2 | 3.9 | 2.5 | 248 | 290 | — | 10 |
| 13 | 48.5 | 46.2 | traces | 2.6 | 219 | 380 | 166 | 8 |
| 14 | 115 | 52.6 | | | 190 | 500 | 87 | 12 |
| 15 | 17 | 43.2 | 3.3 | 2.7 | 196 | 400 | 125 | 16 |
| 16 | 42 | 43.4 | 4.6 | 2.6 | 232 | 400 | 158 | 12 |
| 17 | 49.5 | 46 | 1.3 | 2 | 239 | 370 | 172 | 10 |
| 18 | 112 | 42.4 | 2.1 | 2 | 218 | 390 | 160 | 8 |
| 19 | 155 | 45.8 | traces | 2 | 205 | 400 | 130 | 10 |
| 20 | 38 | 42.8 | 2.5 | 2.5 | 225 | 400 | 156 | 10 |

EXAMPLE 21

4.8 g of anhydrous MgCl$_2$, 4.78 g of MgCl$_2$.CH$_3$COOC$_2$H$_5$ and 0.41 g of TiCl$_4$ are ground for 60 hours in the apparatus described in comparative example 1. A 3 l autoclave, thermoregulated at +5° C, is fed, in the order stated, with: 510 g of propylene, ethylene up to a pressure of 8.6 atm., hydrogen up to a pressure of 9.6 atm. and a catalyst prepared by mixing, in 8 cc of heptane, 2 cc of Al(iC$_4$H$_9$)$_3$ with 0.037 g of the TiCl$_4$/MgCl$_2$. 1/8CH$_3$COOC$_2$H$_5$ mixture. During the run the pressure is kept constant by feeding in ethylene. Time required by the run : 1 hour.

47 g of a copolymer having a propylene content equal to 40% by weight are thus obtained. On X-ray analysis the copolymer shows a crystallinity of 5.7%. The inherent viscosity is equal to 2.2 dl/g.

Characteristics of the vulcanized copolymer:
tensile strength = 262 kg/cm$^2$
elongation to break = 340 %
modulus at 300% = 210 kg/cm$^2$
residual deformation at break = 12%

EXAMPLE 22

4.79 g of anhydrous MgCl$_2$, 4.8 g of MgCl$_2$. O(C$_2$H$_5$)$_2$ and 0.41 g of TiCl$_4$ are ground under the conditions of the previous examples for 60 hours.

The copolymerization test is conducted under conditions similar to those described in Example 21, at an ethylene overpressure of 2.8 atm. The catalyst is prepared by mixing, in 8 cc of n-heptane, 2 cc of Al-(iC$_4$H$_9$)$_3$ with 0.046 g of the TiCl$_4$/MgCl$_2$. 1/8O(C$_2$H$_5$)$_2$ mixture. The run is stopped after 1 hour.

Copolymer weight : 33 g
Propylene content : 46% by weight
Inherent viscosity : 3.2 dl/g
Crystallinity : 1.8%
Characteristics of the vulcanized product:
tensile strength = 248 kg/cm$^2$
elongation at break = 340%
modulus at 300% = 196 kg/cm$^2$
residual deformation at break = 8%

EXAMPLE 23

3.97 g of anhydrous MgCl$_2$ and 0.60 g of

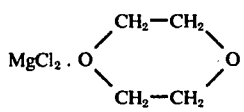

are ground under the conditions of previous examples for 24 hours.

0.2 g of TiCl$_4$ are added thereto, and grinding is continued for a further 62 hours.

The copolymerization test is conducted under conditions similar to those described in Example 21, at an ethylene overpressure of 1.9 atm. and a hydrogen overpressure of 1 atm. The catalyst is prepared by mixing, in 8 cc of n-heptane, 0.94 cc of Al(iC$_4$H$_9$)$_3$ with 0.062 g of a

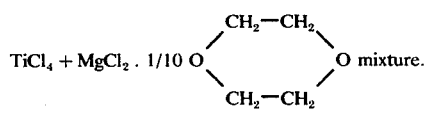

mixture.

The run is stopped after 2 hours.
Copolymer yield : 20 g
Propylene content : 47.8% by weight
Inherent viscosity : 2.2 dl/g
Crystallinity : 3.1%
Characteristics of the vulcanized product:
Tensile strength = 217 kg/cm$^2$
Elongation at break = 440%
Modulus at 300% = 122 kg/cm$^2$
Residual deformation at break = 16%

EXAMPLE 24

4.48 g of anhydrous MgCl$_2$ and 2.42 g of C$_6$H$_5$CN are ground under the conditions of previous examples for 24 hours. After addition of 0.3 g of 3TiCl$_3$. AlCl$_3$ grinding is carried on for a further 62 hours.

The copolymerization run is effected at +30° C by feeding the autoclave with 480 of propylene and with ethylene up to a pressure of 16.7 atm. The catalyst is prepared by mixing, in 8 cc of heptane, 2.5 cc of Al(iC$_4$H$_9$)$_3$ with 0.038 g of a 3TiCl$_3$. AlCl$_3$/MgCl$_2$. ½C$_6$H$_5$CN mixture. The run is stopped after 1 hour, 189 g of copolymer are obtained.

Propylene content : 51.4% by weight
Inherent viscosity : 1.8 dl/g
The spectrum obtained on X-ray analysis exhibits crystallinity traces characteristics of the vulcanized product:
tensile strength = 190 kg/cm$^2$
elongation at break = 400%
modulus at 300% = 121 kg/cm$^2$
residual deformation at break = 12%

EXAMPLE 25

The copolymerization run is effected under the same conditions as in Example 24. The catalyst is prepared by mixing, in 8 cc of heptane, 4.24 cc of Al(iC$_4$H$_9$)$_3$ with 0.065 g of a TiCl$_3$(OC$_6$H$_5$)/MgCl$_2$. ½C$_6$H$_5$CN mixture obtained by grinding 4.04 g of MgCl$_2$, 2.19 g of C$_6$H$_5$CN and 0.35 g of TiCl$_3$(OC$_6$H$_5$) under the same conditions as described in Example 24.

Copolymer yield = 262 g
propylene content = 53.2% by weight
inherent viscosity = 1.8 dl/g
crystallinity = traces
Characteristics of the vulcanized product:
tensile strength = 173 kg/cm$^2$
elongation at break = 440%
modulus at 300% = 101 kg/cm$^2$
residual deformation at break = 13%

EXAMPLE 26

Example 2 is repeated at a temperature of −10° C, at an ethylene overpressure of 1.3 atm. and at a hydrogen overpressure of 1 atm. The catalyst is prepared by mixing in 8.5 cc of heptane, 2 cc of Al(iC$_4$H$_9$)$_3$ with 0.119 g of a TiCl$_4$/MgCl$_2$. ½C$_6$H$_5$CN mixture. The run is stopped after 1 hour.

Copolymer yield = 152 g
propylene content = 50.8% by weight
inherent viscosity = 2 dl/g
On X-ray anaylsis, the copolymer exhibits traces of crystallinity.
Properties of the vulcanized product:
tensile strength = 200 kg/cm$^2$
elongation at break = 390%
modulus at 300% = 139 kg/cm$^2$
residual deformation at break = 10%

EXAMPLE 27

Example 26 is repeated at a temperature of +40° C, at an ethylene overpressure of 3.7 atm., in the absence of hydrogen.

The catalyst is prepared by mixing, in 8 cc of heptane, 2 cc of Al(iC$_4$H$_9$)$_3$ with 0.029 g of a TiCl$_4$/MgCl$_2$. ½C$_6$H$_5$CN mixture. The run is stopped after 1 hour.
Copolymer yield = 88 g
propylene content = 46.2% by weight
inherent viscosity = 2.2 dl/g
On X-ray analysis, the copolymer exhibits traces of crystallinity.
Properties of the vulcanized product:
tensile strength = 203 kg/cm$^2$
elongation at break = 420%
modulus at 300% = 114 kg/cm$^2$
residual deformation at break = 8%

EXAMPLE 28

2.52 g of anhydrous MgCl$_2$ and 1.37 g of C$_6$H$_5$CN are ground in a nitrogen atmosphere for 24 hours. Subsequently, 3.89 g of Al$_2$O$_3$ (calcined at 1,200° C for 6 hours) are added thereto and grinding is carried on for an additional 4 hours.

0.695 of TiCl$_4$ is then added and grinding is continued for a further 62 hours.

The copolymerization run is effected under conditions similar to those described in Example 21, at an ethylene overpressure of 1.9 atm. and a hydrogen overpressure of 1 atm. The catalyst is prepared by mixing 1.3 cc of Al(iC$_4$H$_9$)$_3$ with 0.042 g of the TiCl$_4$/Al$_2$O$_3$/MgCl$_2$. ½C$_6$H$_5$CN ground mixture (titanium content = 2% by weight). Time required by the run: 0.5 hours.

Copolymer yield : 191 g
propylene content : 44.5% by weight
inherent viscosity : 2 dl/g
crystallinity : traces
Properties of the vulcanized product:
tensile strength = 219 kg/cm$^2$
elongation at break = 440% modulus at 300% = 123 kg/cm²
residual deformation at break = 8%

EXAMPLE 29

The copolymerization run is carried out under conditions like those described in Example 21, at an ethylene overpressure of 1.9 atm. and a hydrogen overpressure of 1 atm. The catalyst is prepared by mixing, in 8 cc of n-heptane, 2 cc of $Al(iC_4H_9)_3$ with 0.065 g of a $TiCl_4/AlO_3/MgCl_2$. $\frac{1}{4}(C_2H_5)_2NCOOC_2H_5$ mixture. Said mixture has been prepared according to the modalities described in Example 28, by grinding 5.6 g of $MgCl_2$, 1.73 g of $(C_2H_5)_2NCOOC_2H_5$, 1.5 g of $Al_2O_3$ and 0.38 g of $TiCl_4$. The run is stopped after 1 hour.

Copolymer yield = 115 g
propylene content = 46.8% by weight
inherent viscosity = 2.1 dl/g
X-ray crystallinity = traces
Properties of the vulcanized product:
tensile strength = 210 kg/cm²
elongation at break = 420%
modulus at 300% = 123 kg/cm²
residual deformation at break = 10%

EXAMPLE 30

6 g of anhydrous $MgCl_3$ and 3.26 g of $C_6H_5CN$ are ground for 24 hours. Subsequently, 0.73 g of $TiCl_4 \cdot 2(C'H_5)_2O$ are added thereto and grinding is continued for a further 62 hours. The copolymerization run is effected under conditions similar to those described in Example 21, at an ethylene overpressure of 1.9 atm. and a hydrogen overpressure of 1 atm. The catalyst is prepared by mixing, in 8 cc of n-heptane, 1.23 cc of $Al(iC_4H_9)_3$ with 0.017 g of the mixture containing titanium, prepared as described above. The run is stopped after the 1 hour.

Copolymer yield = 63.5 g
propylene content = 43% by weight
inherent viscosity = 2.1 dl/g
crystallinity = 2.6%
Properties of the vulcanized product:
tensile strength = 223 kg/cm²
elongation at break = 400%
modulus at 300% = 146 kg/cm²
residual deformation at break = 8%

EXAMPLE 31

760 g of propylene, ethylene up to a pressure of 7.7 atm. and hydrogen up to a pressure of 8.7 atm. are introduced into a 3 l autoclave, thermoregulated at +5° C. Said autoclave is fed, under a nitrogen pressure, with the catalyst obtained by mixing, in 8 cc of n-heptane, 0.06 g of a $TiCl_4/MgCl_2$. $\frac{1}{2}C_6H_5CH$ mixture (prepared as described in Example 2) with 4.25 cc of $Al(iC_4H_9)_3$ reacted for 3 minutes with 0.02 cc of benzonitrile. The run is stopped — after 1 hour.

Polymer yield = 85 g
propylene content = 40.4% by weight
inherent viscosity = 2.3 dl/g
crystallinity = 4.3%
Properties of the vulcanized product:
tensile strength = 211 kg/cm²
elongation at break = 380%
modulus at 300% = 151 kg/cm²
residual deformation at break = 12%

EXAMPLE 32

The test described in Example 2 is repeated by using 0.032 g of the TiCl /$MgCl_2$. $\frac{1}{2}C_6H_5CN$ mixture and 2.6 cc of $Al(C_6H_{13})_3$. The run is stopped after 1 hour.

Copolymer yield : 55 g
propylene content = 41.2% by weight
inherent viscosity = 2.2 dl/g
crystallinity = 1.9%
Properties of the vulcanized product:
tensile strength = 245 kg/cm²
elongation at break = 380%
modulus at 300% = 164 kg/cm²
residual deformation at break = 10%

EXAMPLE 33

Comparative Example 4 is repeated using 1.7 cc of $Al(iC_4H_9)_3$ and 0.058 g of a $TiCl_4/MnCl_2$. $\frac{1}{2}C_6H_5CN$ mixture, in place of 2 cc of $Al(iC_4H_9)_3$ and 0.071 g of a $TiCl_4/MnCl_2$ mixture. Said mixture has been prepared as follows: 6.61 g of anhydrous $MnCl_2$ and 2.71 g of $C_6H_5CN$ are ground for 24 hours; 0.33 g of $TiCl_4$ is then added and grinding is carried on for a further 62 hours. The copolymerization run is stopped after 1.5 hours. 39 g of copolymer are obtained.

Propylene content = 43.5% by weight
inherent viscosity = 2.2 dl/g
X-ray crystallinity = 2%
Properties of the vulcanized product:
tensile strength = 211 kg/cm²
elongation at break = 400%
modulus at 300% = 135 kg/cm²
residual deformation at break = 8%

EXAMPLE 34

4.8 g of anhydrous $MgCl_2$ and 5.25 g of benzonitrile, diluted with 50 cc of anhydrous n-heptane, are introduced, in a nitrogen atmosphere, into a 100 cc flask. It is heated at reflux, under stirring, for 100 hours. Subsequently, it is cooled down to room temperature, repeatedly washed with n-heptane and under vacuum at room temperature. The analysis shows that the product obtained has the formula $MgCl_2 \cdot C_6H_5CN$. 6.3 g of the complex thus obtained are suspended, in a nitrogen atmosphere, with 30 cc of n-heptane, in a 100 cc flask. After addition of 0.56 g of $TiCl_4$, the whole is heated at reflux, under stirring, for 3 hours. Subsequently, it is filtered at room temperature and washed twice n-heptane (200 cc in total). No benzonitrile was found in the washing liquid. The results obtained from the analysis indicate that the $TiCl_4/MgCl_2 \cdot C_6H_5 CN$ mixture contains 1% by weight of titanium metal.

The autoclave described in Example 1, thermoregulated at +5° C, is fed, in order stated, with : 550 g of propylene, ethylene up to a pressure of 7.7 atm., hydrogen up to a pressure of 8.7 atm. and a catalyst obtained by mixing, in 8 cc of n-heptane, 3 cc of Al-$(iC_4H_9)_3$ with 0.062 g of the $TiCl_4/MgCl_2 \cdot C_6H_5CN$ mixtutre. The run is stopped after 2 hours. 23 g of a copolymer are obtained, having a propylene content of 37.5% by weight. The inherent viscosity is 2.4 dl/g.

The vulcanized copolymer exhibits the following characteristics:
tensile strength = 241 Kg/cm²
elongation at break = 410%
modulus at 300% = 149 Kg/cm²
residual deformation at break = 10%

The elastomeric, vulcanizable copolymers and terpolymers produced by the present process are, in general, amorphous or substantially amorphous. By "substantially amorphous" is meant that the copolymers and terpolymers do not exhibit more than about 15% of crystallinity on X-ray examination.

We claim:

1. A process for preparing saturated, elastomeric and vulcanizable copolymers of ethylene with alpha-olefins having the general formula $CH_2=CHR$ in which R is an alkyl radical containing from 1 to 6 carbon atoms, or low-unsaturated copolymers of ethylene, said alpha-olefins $CH_2=CHR$ and polyenes, which process comprises copolymerizing, at a temperature of from $-50°C$ to $+150°C$, a mixture of said monomers in contact with a catalyst prepared by mixing:
   a. a catalyst-forming component selected from the group consisting of the hydrides and organometallic compounds of aluminum with
   b. a catalyst-forming component consisting of the product obtained by cogrinding a halogenated Ti compound with a support comprising, as the essential support constituent, an anhydrous magnesium or manganese dihalide, and with a Lewis base, under conditions such that, in the absence of the base, the support attains a surface area higher than 5 m²/g, the total molar ratio between the magnesium or manganese dihalide and the Lewis base in the catalyst being between 2:1 and 5:1, and the amount of Ti in catalyst-forming component (b) being between 0.1% and 30% by weight.

2. A process for preparing saturated, elastomeric and vulcanizable copolymers of ethylene with alpha-olefins having the general formula $CH_2=CHR$ in which R is an alkyl radical containing from 1 to 6 carbon atoms, or low unsaturated copolymers of ethylene, said alpha-olefins, and polyenes, which process comprises copolymerizing at a temperature of $-50°C$ to $+150°C$, a mixture of said monomers in contact with a catalyst obtained by mixing:
   a. a catalyst-forming component selected from the group consisting of hydrides and organometallic compounds of aluminum with
   b. a catalyst-forming component consisting of the product obtained by cogrinding a support the essential support constituent of which is a magnesium or manganese dihalide at least partially complexed with a Lewis base and a halogenated titanium compound, under conditions such that magnesium or manganese dihalide not complexed with the Lewis base attains a surface area higher than 5 m²/g, the total molar ratio between the magnesium or manganese dihalide and the Lewis base in the catalyst being between 2:1 and 5:1, and the amount of Ti in the catalyst-forming component (b) being between 0.1% and 30% by weight.

3. The process of claim 2 wherein the Lewis base is an electron-donor compound in which the electron-donor atom (or atoms) is (or are) selected from O, P and N.

4. The process of claim 2, wherein the catalyst-forming component (a) is selected from the group consisting of aluminum trialkyls and aluminum trialkyls partially complexed with a Lewis base.

* * * * *